US010915873B2

(12) United States Patent
Martin

(10) Patent No.: US 10,915,873 B2
(45) Date of Patent: Feb. 9, 2021

(54) SYSTEM AND METHOD FOR PROVIDING MOBILE VOICE, DATA, AND TEXT SERVICES TO SUBSCRIBERS USING CRYPTOCURRENCY

(71) Applicant: Eric Martin, Atlanta, GA (US)

(72) Inventor: Eric Martin, Atlanta, GA (US)

( * ) Notice: Subject to any disclaimer, the term of this patent is extended or adjusted under 35 U.S.C. 154(b) by 454 days.

(21) Appl. No.: 15/691,720

(22) Filed: Aug. 30, 2017

(65) Prior Publication Data

US 2018/0060835 A1 Mar. 1, 2018

Related U.S. Application Data

(60) Provisional application No. 62/381,461, filed on Aug. 30, 2016.

(51) Int. Cl.
*G06Q 20/06* (2012.01)
*G06Q 30/02* (2012.01)
(Continued)

(52) U.S. Cl.
CPC ......... *G06Q 20/065* (2013.01); *G06Q 20/085* (2013.01); *G06Q 20/145* (2013.01);
(Continued)

(58) Field of Classification Search
CPC .................................................. G06Q 20/065
(Continued)

(56) References Cited

U.S. PATENT DOCUMENTS 9,351,124 B1 * 5/2016 Shelton ................. H04W 4/029
10,043,174 B1 * 8/2018 Chikkanna ......... G06Q 20/3676
(Continued)

OTHER PUBLICATIONS

"Blockchain Technology: Beyond Bitcoin," by Michael Crosby; Nachiappan; Pradan Pattanayak; Sanjeev Verma and Vignesh Kalyanaraman. Applied Innovation Review. Issue 2: Jun. 2016. (Year: 2016).*

*Primary Examiner* — Sara C Hamilton
(74) *Attorney, Agent, or Firm* — Charlena Thorpe, Esq.; Incorporating Innovation LLC

(57) ABSTRACT

Implementations of a cryptocurrency mobile services system and method for offering a global roaming and payment procedure is provided. In some implementations, a computer-implemented method for offering these mobile services comprise receiving over a network a plurality of competing offers for mobile services from a plurality of mobile services providers computing devices, respectively. In some implementations, the method further comprises transmitting over a network one or more of the received offers for mobile services to a plurality of mobile devices, wherein for each mobile device, the offer transmitted is based on the location of the mobile device and the coverage available at the location of the mobile device. In some implementations, the method further comprises receiving over a network an indication of a response to a transmitted offer for mobile service from a mobile device. In some implementations, the method further comprises, upon receiving an acceptance of an offer for mobile service from a mobile device, purchasing the accepted offer using cryptocurrency. In some implementations, the method further comprises, delivering the accepted mobile service to a mobile device and monitoring performance of the contract.

13 Claims, 2 Drawing Sheets

(51) Int. Cl.
  *G06Q 20/08* (2012.01)
  *G06Q 20/14* (2012.01)
  *H04L 9/06* (2006.01)

(52) U.S. Cl.
  CPC ..... *G06Q 30/0261* (2013.01); *G06Q 30/0267* (2013.01); *H04L 9/0637* (2013.01); *H04L 2209/56* (2013.01); *H04L 2209/80* (2013.01)

(58) Field of Classification Search
  USPC .......................................................... 705/35
  See application file for complete search history.

(56) References Cited

U.S. PATENT DOCUMENTS

| | | | | |
|---|---|---|---|---|
| 2001/0034677 A1* | 10/2001 | Farhat | ................... | G06Q 20/02 705/30 |
| 2001/0034693 A1* | 10/2001 | Farhat | ................... | G06Q 20/02 705/37 |
| 2002/0058499 A1* | 5/2002 | Ortiz | ................... | H04L 67/289 455/412.1 |
| 2002/0188562 A1* | 12/2002 | Igarashi | ............... | G06Q 20/102 705/40 |
| 2003/0153298 A1* | 8/2003 | Eder | ..................... | G06Q 20/04 455/406 |
| 2005/0038707 A1* | 2/2005 | Roever | .................. | G06Q 20/12 705/21 |
| 2005/0038724 A1* | 2/2005 | Roever | .................. | G06Q 20/12 705/35 |
| 2005/0234860 A1* | 10/2005 | Roever | .................. | G06F 21/10 |
| 2005/0246193 A1* | 11/2005 | Roever | .................. | G06Q 30/06 705/35 |
| 2007/0287498 A1* | 12/2007 | Wang | .................. | G06Q 10/087 455/556.1 |
| 2009/0323953 A1* | 12/2009 | Narayan | ................ | G06Q 40/00 380/258 |
| 2010/0069035 A1* | 3/2010 | Johnson | ................... | A47G 1/16 455/404.1 |
| 2010/0185534 A1* | 7/2010 | Satyavolu | ............ | G06Q 10/063 705/30 |
| 2011/0213688 A1* | 9/2011 | Santos | ................... | G06Q 30/04 705/34 |
| 2012/0190386 A1* | 7/2012 | Anderson | .............. | G01C 15/04 455/456.3 |
| 2013/0024493 A1* | 1/2013 | Salonen | ................. | G06Q 10/02 709/202 |
| 2013/0238472 A1* | 9/2013 | Fan | ........................ | G06Q 30/04 705/34 |
| 2013/0337789 A1* | 12/2013 | Johnson | ................ | H04W 64/00 455/414.1 |
| 2013/0346309 A1* | 12/2013 | Giori | .................. | G06Q 20/0655 705/43 |
| 2016/0142555 A1* | 5/2016 | Kirschbaum | ......... | H04M 15/09 455/406 |
| 2016/0164977 A1* | 6/2016 | Salonen | ................. | G06Q 10/02 709/206 |
| 2016/0259923 A1* | 9/2016 | Papa | .................... | G06F 21/105 |
| 2016/0294783 A1* | 10/2016 | Piqueras Jover | ... | H04L 63/0442 |

* cited by examiner

SYSTEM AND METHOD FOR PROVIDING MOBILE VOICE, DATA, AND TEXT SERVICES TO SUBSCRIBERS USING CRYPTOCURRENCY

CROSS REFERENCE TO RELATED APPLICATION

This application claims the benefit of U.S. Patent Application Ser. No. 62/381,461, which was filed on Aug. 30, 2016, and is incorporated herein by reference in its entirety.

TECHNICAL FIELD

This disclosure relates to providing mobile voice, data, and text services to subscribers using cryptocurrency. In some implementations, this disclosure relates to providing mobile voice, data, and text services to subscribers using cryptography technology. In some implementations, this disclosure relates to providing mobile voice, data, and text services to subscribers and to effectuate payments for these services using blockchain, sidechain, and smart contracts technologies with cryptocurrency.

BACKGROUND

Despite technological advancements and global payment platforms, consumers of mobile voice, data, and text services are constantly faced with connectivity issues when crossing into and out of service provider coverage areas.

DETAILED DESCRIPTION

Figure 1:
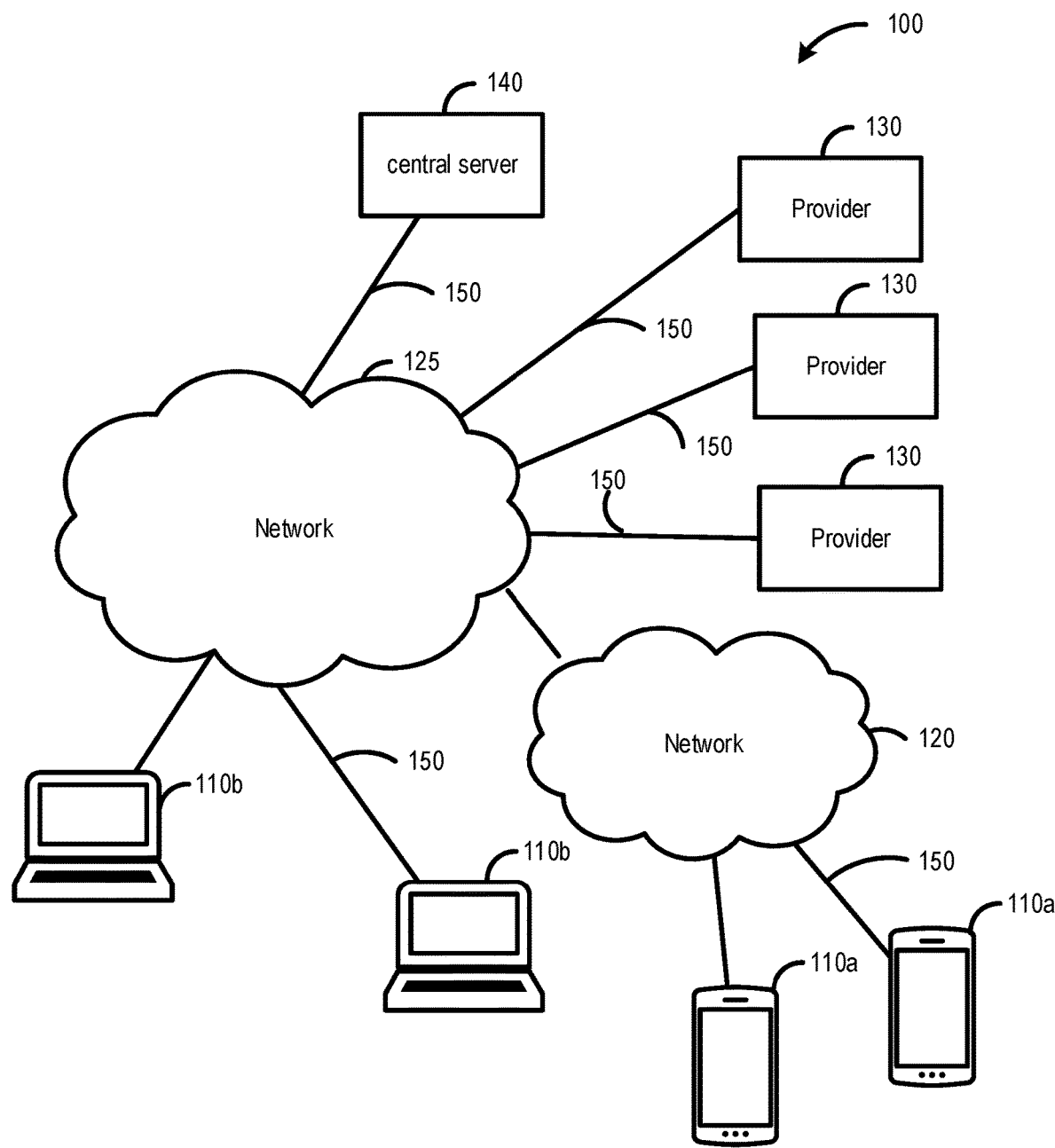
FIG. 1 illustrates an implementation of an example cryptocurrency mobile services (CMS) environment for offering a global roaming and payment procedure according to the present disclosure.

Implementations of a cryptocurrency mobile services system and method for offering a global roaming and payment procedure is provided. In some implementations, a computer-implemented method for offering these mobile services comprises receiving over a network a plurality of competing offers for mobile services from a plurality of mobile services providers computing devices, respectively. In some implementations, at least a portion of the network may be a secure and trusted distributed network (e.g., a blockchain). In some implementations, the offers may be electronic smart contracts with comprehensive terms and conditions. In some implementations, the offers may be data elements, such as terms and conditions, embedded in computer code. In some implementations, when the data elements embedded in computer code is packaged as a whole and referenced by a blockchain transaction the smart contract is formed, and together with the exchange of consideration such as Bitcoin or other cryptocurrency, the smart contract becomes effective.

In some implementations, the method further comprises transmitting over a network one or more of the received offers for mobile services to a plurality of mobile devices, wherein for each mobile device, the offer transmitted is based on the location of the mobile device and the coverage available at the location of the mobile device. In some implementations, at least a portion of the network may be a secure and trusted distributed network (e.g., a blockchain).

In some implementations, an offer may be specific to a particular mobile device as the offer may be permanently tracked on a distributed blockchain and/or sidechain network. In some implementations, an offer may be set to expire at any designated time automatically.

In some implementations, the method further comprises receiving over a network an indication of a response to a transmitted offer for mobile service from a mobile device. In some implementations, the method further comprises, upon receiving an acceptance of an offer for mobile service from a mobile device, purchasing the accepted offer using cryptocurrency. In some implementations, the method further comprises, delivering the accepted mobile service to a mobile device.

In some implementations, trusted, private blockchains, a private centralized ledger system, or sidechains may run in parallel to and directly integrated with (or not) blockchains such as Bitcoin. In some implementations, a sidechain may be distributed like a public blockchain. In some implementations, a sidechain may use trust-based methodologies similar to public blockchains. In some implementations, a private sidechain may effectuate the exchange of value in either existing currencies (e.g., USD, EUR, GBP, etc.) or even commonly accepted cryptocurrencies (e.g., Bitcoin), depending on the end-user customers' (buyer and seller) preference. In some implementations, sidechains enable operators to deliver orders with associated features, terms and conditions in real time, and per offer. In some implementations, sidechains may be used to exchange crypotcurrencies for exisitng currencies and to securely transmit these currencies to providers.

In this way, implementations of a cryptocurrency mobile services system according to the present disclosure receive mobile services offers from mobile service providers and present these offers to customers via a mobile application. Customers can select and purchase offers using cryptocurrency via the mobile application. Mobile services are then provided to a mobile device based on the terms in the offer. In some implementations, the cryptocurrency mobile services system monitors performance to ensure that mobile services are provided based on the purchased offer. In some implementations, the cryptocurrency mobile services system monitors performance to ensure that mobile services are provided based on the purchased offer via sidechains. In some implementations, the cryptocurrency mobile services system may cancel a service based on the offer details within the smart contracts.

Furthermore, in this way, Bitcoin's (for example, or other cryptocurrency) distributed public ledger technology framework, using 'blockchain', combined with private ledgers ('sidechains') may be used to govern 'smart contracts' employing performance monitoring technology 'oracles'. A trusted central counterparty in the form of a 'private sidechain' may be setup to essentially break down competitive commercial barriers while offering consumers seamless and unified global roaming and simplified payment procedures while minimizing costs and risk to service providers.

FIG. 1 illustrates an example cryptocurrency mobile services (CMS) environment 100 for offering a global roaming and payment procedure according to the present disclosure.

As shown in FIG. 1, the CMS environment 100 can include customer devices 110a and 110b (collectively customer device 110), a wireless cellular network 120, a network 125, and mobile services provider devices 130, and a central server 140. In some implementations, at least a portion of the network 125 may be a secure and trusted distributed network (e.g., a blockchain). In some implementations, at least a portion of central server 140 may be a sidechain.

Customer devices 110a and 110b are depicted as a mobile phone 110a and desktop computer 110b, respectively, but customer devices 110 may comprise any type of computing device, such as a desktop computer system, a laptop, cellular phone, a smart device, a mobile telephone, a tablet-style computer, or any other device capable of wireless or wired communication.

Similarly, mobile services provider devices 130 may comprise any type of computing device, such as a desktop computer system, a laptop, cellular phone, a smart device, a mobile telephone, a tablet-style computer, or any other device capable of wireless or wired communication.

In some implementations, customer devices 110 and mobile services provider devices 130 may include one or more processors, one or more memories, one or more displays, one or more interfaces, one or more components capable of inputting data, one or more components capable of outputting data, one or more components capable of communicating with any other component of the CMS environment 100, or any other component suitable for a particular purpose.

In some implementations, the customer device 110a can connect to the network 125 through a wireless cellular network 120, such as GPRS-based and CDMA-based wireless networks, as well as 802.16 WiMax and long-range wireless data networks.

The central server 140 may include a processor, memory, user accounts, and one or more modules to perform various transactions.

Customer devices 110a and 110b and mobile services provider devices 130 can interact with the central server 140 via an application, such as a web browser or a native application, residing on the customer devices 110 or mobile services provider devices 130.

Components of the CMS environment 100 may communicate with any other component of the CMS environment 100 over network 125. Network 125 may be any suitable network. In some implementations, for example, one or more portions of network 125 may include a distributed network, an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another network 125, or a combination of two or more of the foregoing.

In some embodiments, components of the CMS environment 100 may be configured to communicate over links 150. Links 150 may connect components of the CMS environment 100 to networks 120, 125 or to each other. In some implementations, one or more links 150 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 may each include a distributed network, an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 116, or a combination of two or more such links 150. Links 150 may not be the same throughout the CMS environment 100.

In general, mobile service providers submit via mobile services provider devices 130 offers for mobile service (voice, data, text or a combination of the foregoing) to the central server 140. In some implementations, an offer may include terms such a price, quantity, location, time, expiration, and any other terms or conditions.

The central server 140 transmits these offers to the network 125 and to customer devices 110. In some implementations, the central server 140 transmits offers for services to a mobile phone to be used by the mobile phone based on the location of the mobile phone and the coverage available at that location from one or more providers.

Customer devices 110 display the offers to customers to review and select. In some implementations, once a customer accepts an offer, the customer device 110 transmits the acceptance to the network 125 which then transmits the acceptance to the central server 140.

In some implementations, once the central server 140 receives the acceptance, the central server purchases the selected offer using cryptocurrency thereby creating a contract between the customer and the service provider. A cryptocurrency is typically a peer-to-peer, decentralized, digital currency whose implementation relies on the principles of cryptography to validate transactions and generate the currency itself. Some examples of cryptocurrencies are: Bitcoin, Etherium, Litecoin, Ripple, Peercoin, and Dogecoin. The terms of the resulting contract are associated with the cryptocurrency transaction and stored using the principles of cryptography (e.g., secure, trusted, distributed network 125).

In some implementations, once the central server 140 receives the acceptance, the central server purchases the selected offer using any other currency including any future developed currency or digital currency whose implementation relies on the principles of cryptography.

Thereafter, mobile services are provided to a mobile device based on the terms in the contract.

In some implementations, central server 140 monitors performance (smart contracts) to ensure that mobile services are provided based on the contract.

In this way, the CMS environment 100 allows competing operators/providers to deliver offers to a neutral platform (e.g., the central server 140 and, in some implementations, further recorded to the network 125) and to provide the necessary trust via cryptography to manage the exchange of data and money in a secure and unified manner. The CMS environment 100 may eliminate provider requirements to maintain the bandwidth and computing power due to the distributed network 125, and can also eliminate the need for service level agreements between providers. In the CMS environment 100 there is no concept of home networks and visiting networks. Instead, visiting network providers can provide direct services to subscribers on their mobile device within the visiting network without the need for indirect provider-to-provider agreements.

Figure 2:
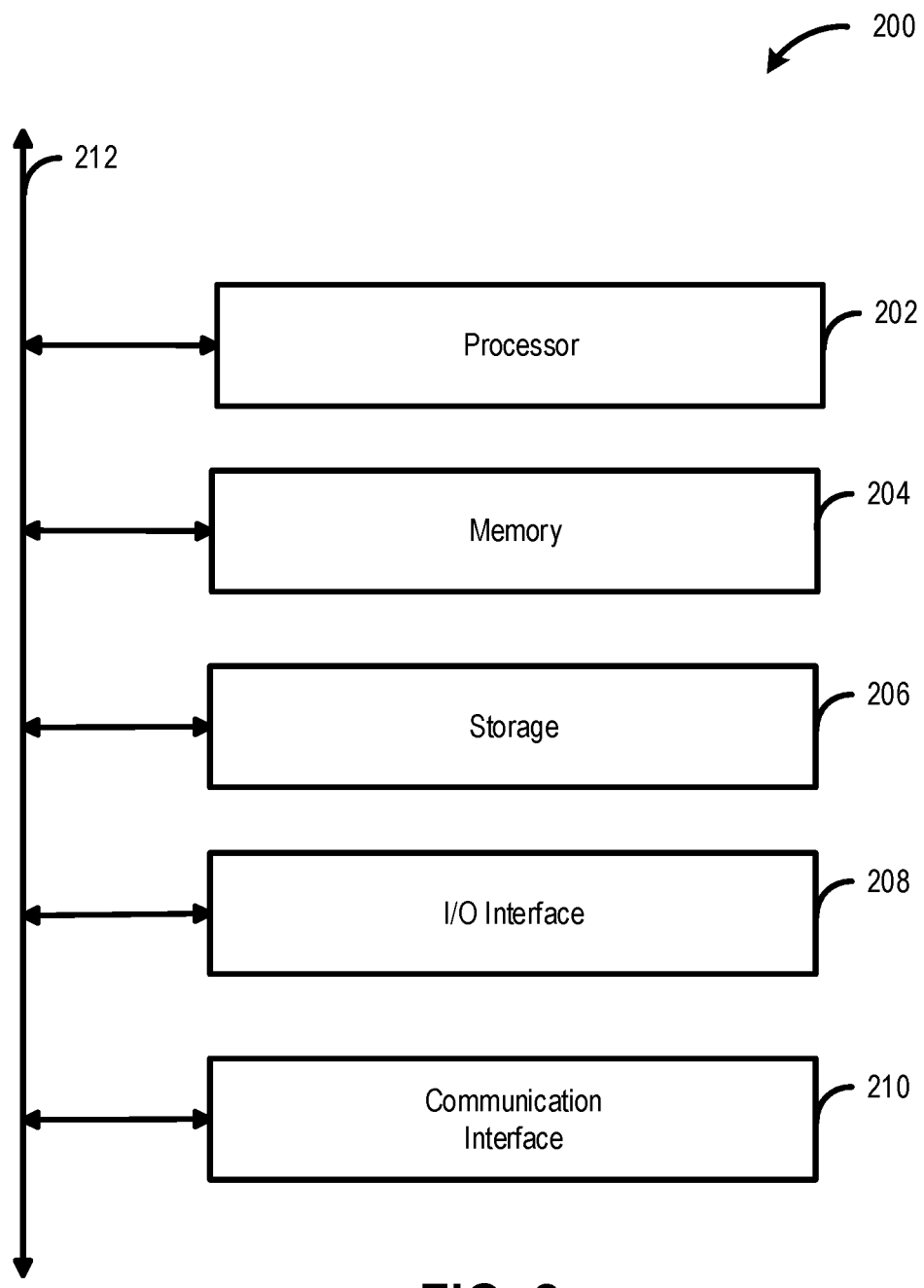
FIG. 2 illustrates an example computer system, which may be used with implementations of the present disclosure.

FIG. 2 illustrates an example computer system 200. In particular embodiments, one or more computer systems 200 perform one or more steps of one or more methods described or illustrated herein. In particular embodiments, one or more computer systems 200 provide functionality described or illustrated herein. In particular embodiments, software running on one or more computer systems 200 performs one or more steps of one or more methods described or illustrated herein or provides functionality described or illustrated herein. Particular embodiments include one or more portions of one or more computer systems 200. Herein, reference to a computer system may encompass a computing device, and vice versa, where appropriate. Moreover, reference to a computer system may encompass one or more computer systems, where appropriate.

Computer system 200 may be any suitable number of computer systems 200. This disclosure contemplates computer system 200 taking any suitable physical form. As example and not by way of limitation, computer system 200 may be an embedded computer system, a system-on-chip (SOC), a single-board computer system (SBC) (such as, for example, a computer-on-module (COM) or system-on-module (SOM)), a desktop computer system, a laptop, an interactive kiosk, a mainframe, a mesh of computer systems, a mobile telephone, a personal digital assistant (PDA), a server, or a combination of two or more of these. Where appropriate, computer system 200 may include one or more computer systems 200; be unitary or distributed; span multiple locations; span multiple machines; or reside in a cloud, which may include one or more cloud components in one or more networks. Where appropriate, one or more computer systems 200 may perform without substantial spatial or temporal limitation one or more steps of one or more methods described or illustrated herein. As an example and not by way of limitation, one or more computer systems 200 may perform in real time or in batch mode one or more steps of one or more methods described or illustrated herein. One or more computer systems 200 may perform at different times or at different locations one or more steps of one or more methods described or illustrated herein, where appropriate.

In some implementations, computer system 200 includes a processor 202, memory 204, storage 206, an input/output (I/O) interface 208, a communication interface 210, and a bus 212. Although this disclosure describes and illustrates a particular computer system having a particular number of particular components in a particular arrangement, this disclosure contemplates any suitable computer system having any suitable number of any suitable components in any suitable arrangement.

In some implementations, processor 202 includes hardware for executing instructions, such as those making up a computer program. As an example and not by way of limitation, to mine cryptocurrencies, record, accept, reject transactions, execute instructions, processor 202 may retrieve (or fetch) the instructions from an internal register, an internal cache, memory 204, or storage 206; decode and execute them; and then write one or more results to an internal register, an internal cache, memory 204, or storage 206. In some implementations, processor 202 may include one or more internal caches for data, instructions, or addresses. The present disclosure contemplates processor 202 including any suitable number of any suitable internal caches, where appropriate. As an example and not by way of limitation, processor 202 may include one or more instruction caches, one or more data caches, and one or more translation look-aside buffers (TLBs). Instructions in the instruction caches may be copies of instructions in memory 204 or storage 206, and the instruction caches may speed up retrieval of those instructions by processor 202. Data in the data caches may be copies of data (e.g., blockchain transaction data) in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches may speed up read or write operations by processor 202. The TLBs may speed up virtual-address translation for processor 202. In some implementations, processor 202 may include one or more internal registers for data, instructions, or addresses. The present disclosure contemplates processor 202 including any suitable number of any suitable internal registers, where appropriate. Where appropriate, processor 202 may include one or more arithmetic logic units (ALUs); be a multi-core processor; or include one or more processors 202. Although this disclosure describes and illustrates a particular processor, this disclosure contemplates any suitable processor.

In some implementations, memory 204 includes main memory for storing instructions (contract terms and conditions) for processor 202 to execute or data for processor 202 to operate on. As an example and not by way of limitation, computer system 200 may load instructions from storage 206 or another source (such as, for example, another computer system 200) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In some implementations, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere). One or more memory buses (which may each include an address bus and a data bus) may couple processor 202 to memory 204. Bus 212 may include one or more memory buses, as described below. In some implementations, one or more memory management units (MMUs) reside between processor 202 and memory 204 and facilitate accesses to memory 204 requested by processor 202. In some implementations, memory 204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 204 may include one or more memories 202, where appropriate. Although this disclosure describes and illustrates particular memory, this disclosure contemplates any suitable memory.

In some implementations, storage 206 includes mass storage for data or instructions (e.g., copy of the blockchain). As an example and not by way of limitation, storage 206 may include an HDD, a floppy disk drive, flash memory, an optical disc, a magneto-optical disc, magnetic tape, or a Universal Serial Bus (USB) drive or a combination of two or more of these. Storage 206 may include removable or non-removable (or fixed) media, where appropriate. Storage 206 may be internal or external to computer system 200, where appropriate. In some implementations, storage 206 is non-volatile, solid-state memory. In some implementations, storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form. Storage 206 may include one or more storage control units facilitating communication between processor 202 and storage 206, where appropriate. Where appropriate, storage 206 may include one or more storages 206. Although this disclosure describes and illustrates particular storage, this disclosure contemplates any suitable storage.

In some implementations, I/O interface 208 includes hardware, software, or both providing one or more interfaces for communication between computer system 200 and one or more I/O devices. Computer system 200 may include one or more of these I/O devices, where appropriate. One or more of these I/O devices may enable communication between a person and computer system 200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 208 for them. Where appropriate, I/O interface 208 may include one or more device or software drivers enabling processor 202 to drive one or more of these I/O devices. I/O interface 208 may include one or more I/O interfaces 208, where appropriate. Although this disclosure describes and illustrates a particular I/O interface, this disclosure contemplates any suitable I/O interface.

In some implementations, communication interface 210 includes hardware, software, or both providing one or more interfaces for communication (such as, for example, packet-based communication) between computer system 200 and one or more other computer systems 200 or one or more networks. As an example and not by way of limitation, communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it. As an example and not by way of limitation, computer system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 200 may include any suitable communication interface 210 for any of these networks, where appropriate. Communication interface 210 may include one or more communication interfaces 210, where appropriate. Although this disclosure describes and illustrates a particular communication interface, this disclosure contemplates any suitable communication interface.

In some implementations, bus 212 includes hardware, software, or both coupling components of computer system 200 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 212 may include one or more buses 212, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101.

This disclosure contemplates one or more computer-readable storage media implementing any suitable storage. In some implementations, a computer-readable storage medium implements one or more portions of processor 202 (such as, for example, one or more internal registers or caches), one or more portions of memory 204, one or more portions of storage 206, or a combination of these, where appropriate. In some implementations, a computer-readable storage medium implements RAM or ROM. In some implementations, a computer-readable storage medium implements volatile or persistent memory. In some implementations, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In some implementations, software includes one or more application programming interfaces (APIs). This disclosure contemplates any suitable software written or otherwise expressed in any suitable programming language or combination of programming languages. In some implementations, software is expressed as source code or object code. In some implementations, software is expressed in a higher-level programming language, such as, for example, C, Perl, or a suitable extension thereof. In some implementations, software is expressed in a lower-level programming language, such as assembly language (or machine code). In some implementations, software is expressed in JAVA. In some implementations, software is expressed in Hyper Text Markup Language (HTML), Extensible Markup Language (XML), or other suitable markup language.

The foregoing description of the embodiments of the invention has been presented for the purpose of illustration;

it is not intended to be exhaustive or to limit the invention to the precise forms disclosed. Persons skilled in the relevant art can appreciate that many modifications and variations are possible in light of the above disclosure. For example. it will apparent to one of ordinary skill in the art that the invention may be used with any electronic network service, even if it is not provided through a website. Any computer-based system that provides networking functionality can be used in accordance with the present invention even if it relies, for example, on e-mail, instant messaging or other forms of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present invention has been explained with reference to specific embodiments. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The present disclosure encompasses all changes, substitutions, variations, alterations, and modifications to the example embodiments herein that a person having ordinary skill in the art would comprehend.

The invention claimed is:

1. A computer-implemented method for offering mobile services, the method comprising:
    receiving by a first system location information about a location for each of a plurality of mobile devices from each of the mobile devices, respectively, wherein the first system comprises one or more servers;
    receiving by the first system coverage information about mobile service coverage available at the respective location for each of the mobile devices, respectively;
    receiving by the first system and over a network a plurality of offers for mobile service from a plurality of mobile services provider computing devices to be transmitted to the one or more of the mobile devices, respectively, wherein for an offered mobile service, information is not sent or received between two mobile services provider computing devices to facilitate the provision of the offered mobile service, wherein at least part of the network for receiving the offers for mobile service from the mobile services provider computing devices is a distributed network comprising blockchain, wherein each of the received offers comprises data elements and wherein the data elements comprise a price for the corresponding mobile service,
    for each of one or more of the received offers, forming by the first system a smart offer by embedding the data elements in computer code and referencing by the first system the data elements embedded in the computer code for the received offers with a blockchain transaction;
    transmitting by the first system and over a network one or more of the received offers for mobile service to one or more of the mobile devices, wherein for each mobile device, the offer transmitted is based on the location of the mobile device and the mobile service coverage available at the location of the mobile device and wherein at least part of the network for transmitting the offers to the mobile devices is a distributed network comprising a blockchain,
    receiving by the first system and over a network an acceptance of at least one of the transmitted offers for mobile service and cryptocurrency from at least one of the mobile devices that received an offer,
    upon receiving by the first system the acceptance of the at least one offer for mobile service from the at least one of the mobile devices, effectuating a smart contract by the first system by purchasing the mobile service accepted using cryptocurrency by transmitting over a network cryptocurrency to the corresponding mobile services provider computing device during a cryptocurrency transaction;
    associating by the first system the smart contract with the cryptocurrency transaction and storing by the first system the smart contract within a distributed network comprising blockchain; and
    monitoring by the first system the performance of the smart contract.

2. The computer-implemented method of claim 1 further comprises delivering the accepted mobile service directly to the corresponding mobile devices by a corresponding mobile services provider.

3. The computer-implemented method of claim 1 wherein at least one of the plurality of offers for mobile service from the plurality of mobile services provider computing devices includes an offer for mobile voice service.

4. The computer-implemented method of claim 1 wherein at least one of the plurality of offers for mobile service from the plurality of mobile services provider computing devices includes an offer for mobile data service.

5. The computer-implemented method of claim 1 wherein at least one of the plurality of offers for mobile service from the plurality of mobile services provider computing devices includes an offer for mobile text service.

6. The computer-implemented method of claim 1 wherein at least one of the plurality of offers for mobile service from the plurality of mobile services provider computing devices includes price terms.

7. The computer-implemented method of claim 1 wherein the cryptocurrency is Bitcoin.

8. A mobile services system for offering a global roaming and payment procedure comprising:
a non-transitory computer readable medium containing instructions that, when executed by a processor on a first computing device, cause the computing device to
receive location information about a location for each of a plurality of mobile devices from each of the mobile devices, respectively,
receive coverage information about mobile service coverage available at the respective location for each of the mobile devices, respectively;
receive over a network a plurality of offers for mobile service from a plurality of mobile services provider computing devices to be transmitted to the one or more of the mobile devices, respectively, wherein for an offered mobile service, information is not sent or received between two mobile services provider computing devices to facilitate the provision of the offered mobile service, wherein at least part of the network for receiving the offers for mobile service from the mobile services provider computing devices is a distributed network comprising blockchain, wherein each of the received offers comprises data elements and wherein the data elements comprise a price for the corresponding mobile service,
for each of one or more of the received offers, form a smart offer by embedding the data elements in computer code and reference the data elements embedded in the computer code for the received offers with a blockchain transaction;
transmit over a network one or more of the received offers for mobile service to one or more of the mobile devices, wherein for each mobile device, the offer transmitted is based on the location of the mobile device and the mobile service coverage available at the location of the mobile device and wherein at least part of the network for transmitting the offers to the mobile devices is a distributed network comprising a blockchain,
receive over a network an acceptance of at least one of the transmitted offers for mobile service and cryptocurrency from at least one of the mobile devices that received an offer,
upon receiving the acceptance of the at least one offer for mobile service from the at least one of the mobile devices, effectuate a smart contract by purchasing the mobile service accepted using cryptocurrency by transmitting over a network cryptocurrency to the corresponding mobile services provider computing device during a cryptocurrency transaction;
associate the smart contract with the cryptocurrency transaction and store the smart contract within a distributed network comprising blockchain; and
monitor the performance of the smart contract.

9. The mobile services system of claim 8 further comprising:
a non-transitory computer readable medium containing instructions that, when executed by a processor on a mobile device, cause the mobile phone to
transmit over a network to the first computing device location information about a location for the mobile device,
receive over a network from the first computing device one or more offers for mobile service wherein at least part of the network for receiving the offers is a distributed network comprising a blockchain,
transmit over a network to the first computing device an acceptance of at least one of the transmitted offers for mobile service and cryptocurrency, and
receive the accepted mobile service directly from a mobile services provider.

10. The mobile services system of claim 8 wherein at least one of the plurality of offers for mobile service from the plurality of mobile services provider computing devices includes an offer for mobile voice service.

11. The mobile services system of claim 8 wherein at least one of the plurality of offers for mobile service from the plurality of mobile services provider computing devices includes an offer for mobile data service.

12. The mobile services system of claim 8 wherein at least one of the plurality of offers for mobile service from the plurality of mobile services provider computing devices includes an offer for mobile text service.

13. The mobile services system of claim 8 wherein at least one of the plurality of offers for mobile service from the plurality of mobile services provider computing devices includes price terms.

\* \* \* \* \*